(No Model.) 4 Sheets—Sheet 1.
J. LOEBER.
COMBINED PHOTOGRAPHIC CAMERA AND PLATE HOLDER.
No. 363,833. Patented May 31, 1887.
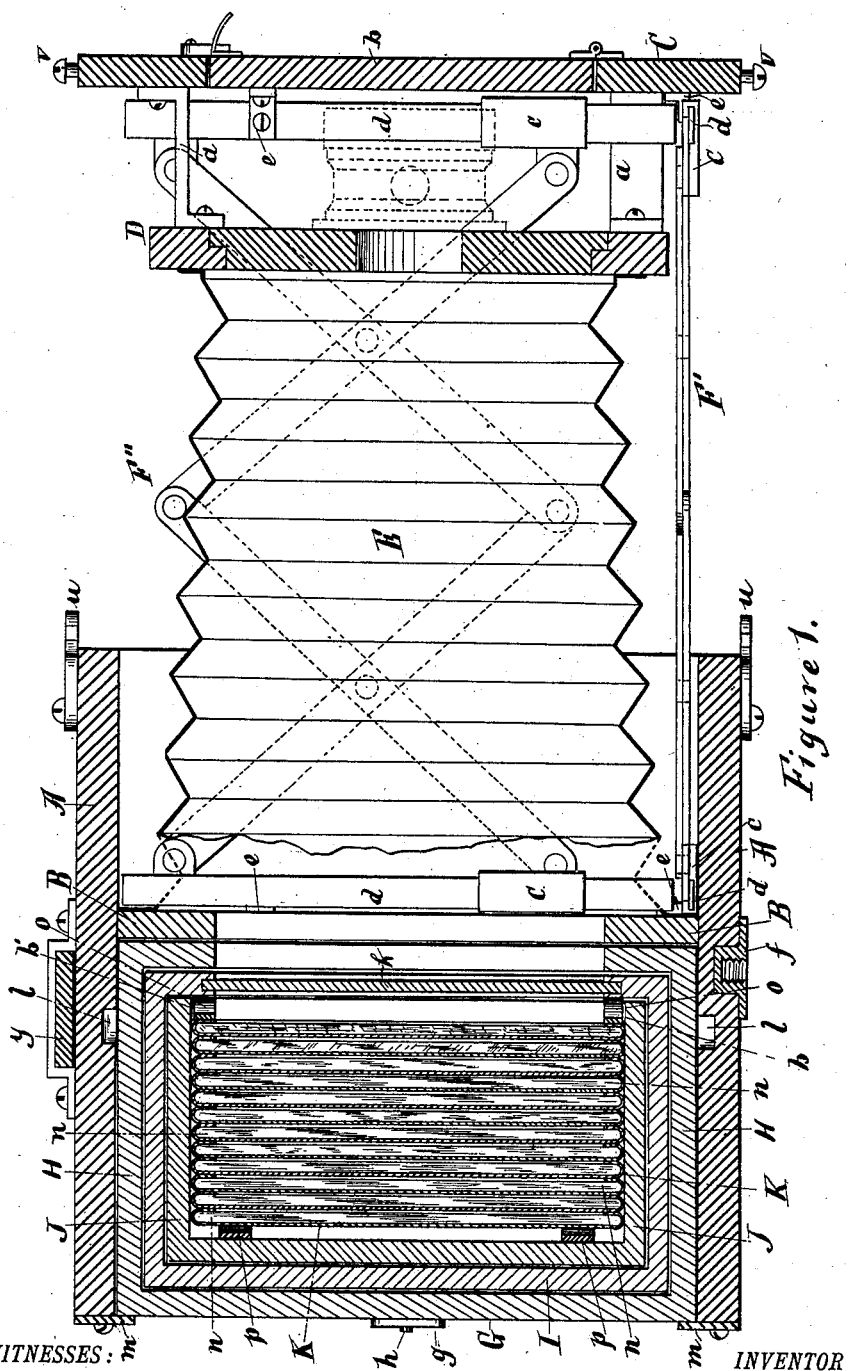
WITNESSES:
W. E. Carlile
J. S. Rowe
INVENTOR
John Loeber
BY Joseph L. Levy
his ATTORNEY

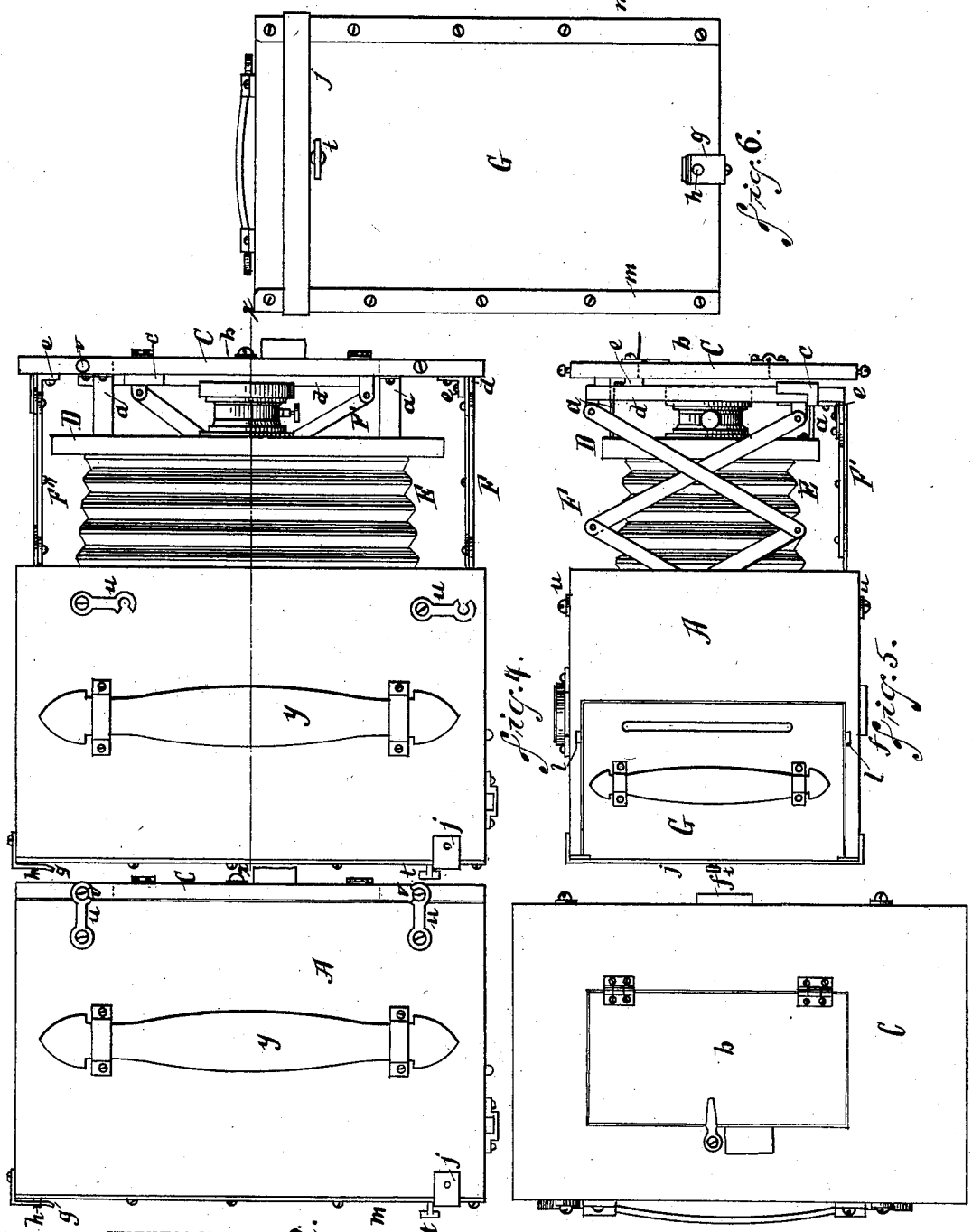

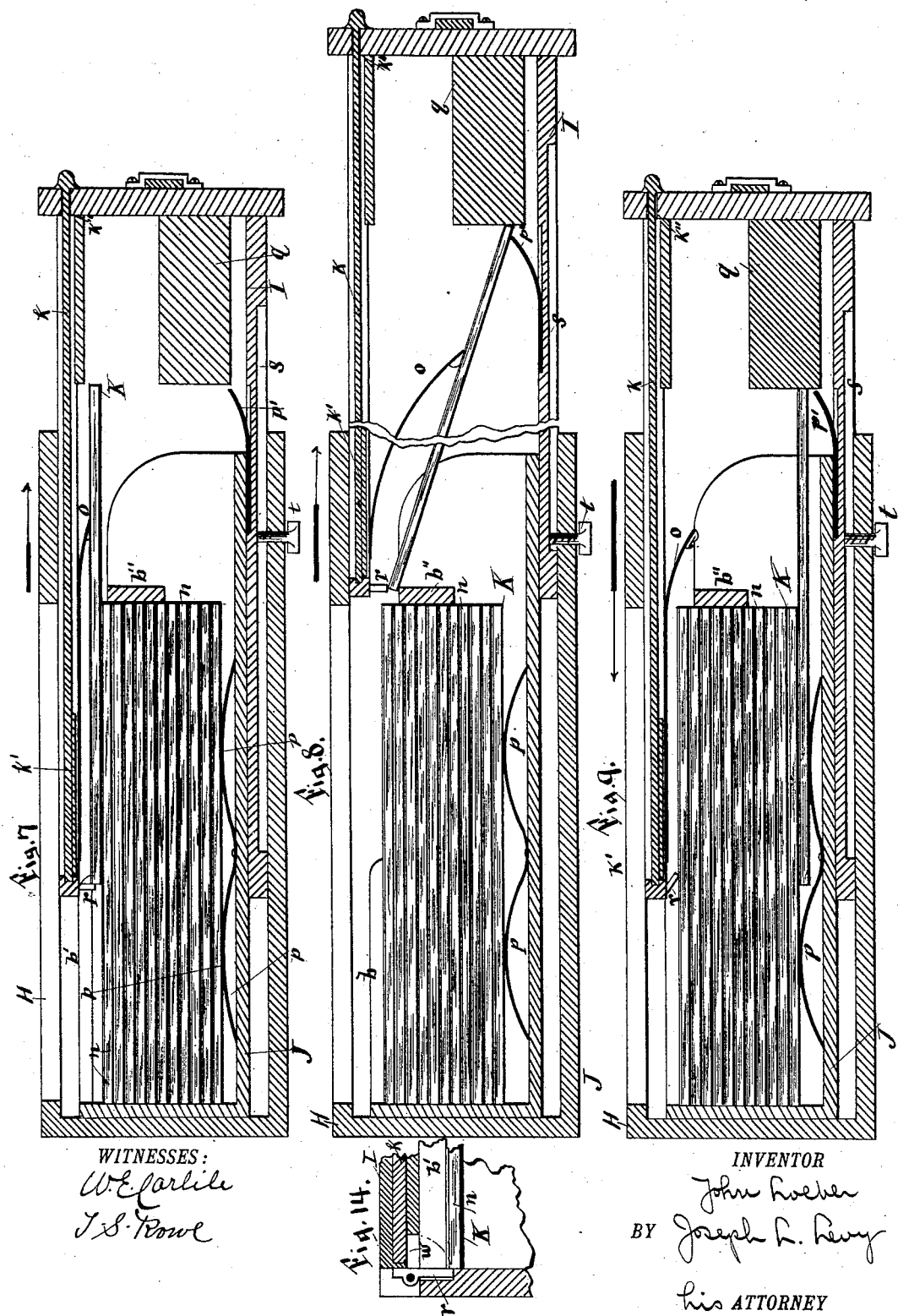

(No Model.) 4 Sheets—Sheet 4.
J. LOEBER.
COMBINED PHOTOGRAPHIC CAMERA AND PLATE HOLDER.
No. 363,833. Patented May 31, 1887.
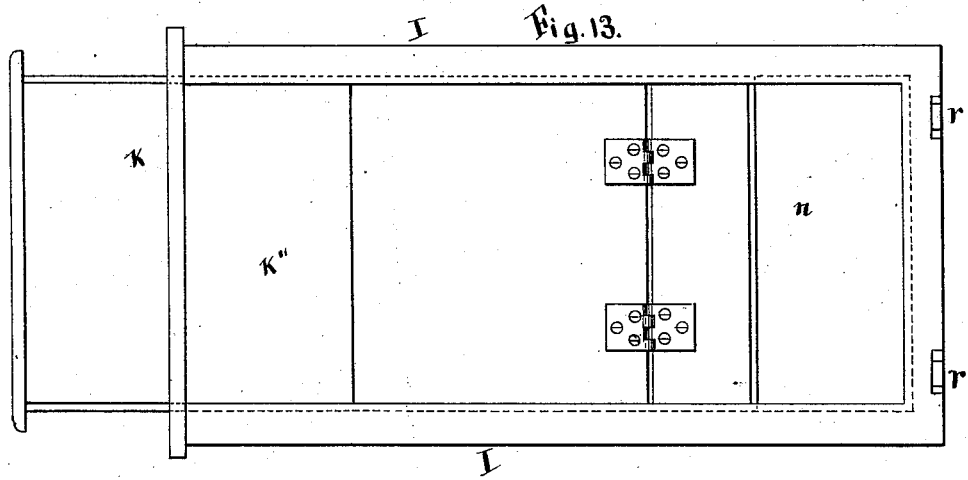
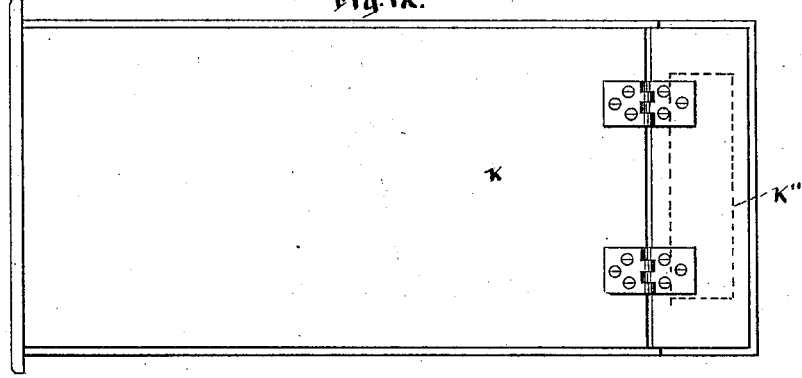
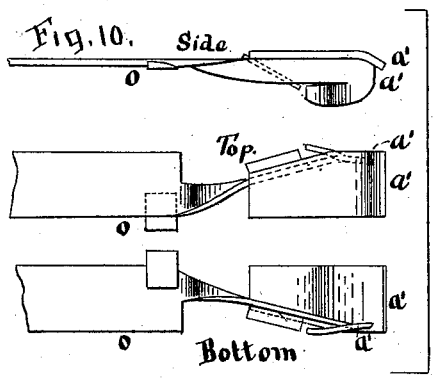
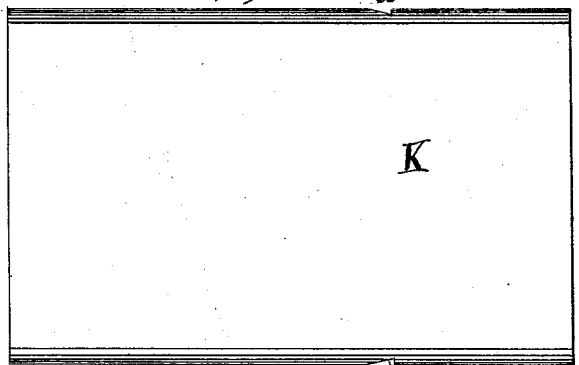
WITNESSES:
W. E. Carlile
J. S. Rowe
INVENTOR
John Loeber
BY Joseph L. Levy
his ATTORNEY
N. PETERS, Photo-Lithographer, Washington, D. C.

UNITED STATES PATENT OFFICE.

JOHN LOEBER, OF BROOKLYN, NEW YORK.

COMBINED PHOTOGRAPHIC CAMERA AND PLATE-HOLDER.

SPECIFICATION forming part of Letters Patent No. 363,833, dated May 31, 1887.

Application filed October 25, 1886. Serial No. 217,090. (No model.)

*To all whom it may concern:*

Be it known that I, JOHN LOEBER, a citizen of the United States, and a resident of Brooklyn, county of Kings, and State of New York, have invented a new and useful Improvement in a Combined Photographic Camera and Plate-Holder, of which the following is a specification.

My invention relates to a combined photographic camera and plate-holder, which I so construct as to enable the plate-holder, bellows, lens, and all parts to be compactly inclosed within a very small space.

Referring to the plate-holder, my invention lies in so constructing it that it shall form a part of the camera, and can hold a large number of plates, which can be exposed one after the other without requiring a dark room.

In the operation of my plate-holder any number of plates can be exposed one after the other, each plate after exposure being removed and a new plate presented for a subsequent exposure, and this is accomplished by one manipulation of the plate-holder while it is in the camera.

In the drawings, Figure 1 is a longitudinal section of my combined camera and plate-holder, taken on the line $x\ x$, Fig. 4. Fig. 2 is a top view of the same, showing the camera in its closed condition. Fig. 3 is a front view of the same. Fig. 4 is a top view showing the bellows, lens, &c., ready for use. Fig. 5 is a side view of the same. Fig. 6 is an end view showing the position the plate-holder occupies in the camera. Figs. 7, 8, and 9 are longitudinal sections of the plate holder, showing the working of the same, the arrows indicating the direction taken by the plate in changing. Fig. 10 illustrates, respectively, a side, top, and bottom view of the spring-clip I use to move the plates. Fig. 11 illustrates a top view of a plate-carrier, showing angular indentation with which the spring-clip engages. Fig. 12 is a top view of the exposing slide. Fig. 13 is a top view of the inside case of the plate-holder, showing the exposing-slide partly withdrawn. Fig. 14 is a sectional view of the upper left-hand corner of the plate-holder, showing the position of the hinged plate I use to move the plates.

Similar letters refer to similar parts throughout the several views.

In Fig. 1, A is the body of the camera. B is a partition dividing the camera-body in two, which partition has an opening in it, which allows of the exposure of the plate.

In the body of the camera A, I construct grooves $l\ l$ for the admission of the ground glass. Of course it must be understood that the plate-holder is withdrawn when the ground glass is to be inserted. After the focusing is completed, the ground glass is withdrawn and the plate-holder returned to its position in the camera. It is absolutely essential that the grooves $l\ l$ should be so placed as to set the ground glass in a true line with the leading plate.

C is the movable front of the camera, to which is affixed, by means of the horizontal supports $a\ a$, the camera-front proper, D, to which the bellows E is attached, and which carries the lens or lenses, as the case might be, and all the other appurtenances belonging to camera-fronts. To the front D a rising front may be affixed.

The back or stationary end of the bellows is fastened rigidly to the partition B. In the movable front C of the camera I hinge a small door, $b$, which has to be made large enough for the working field of the lens. The fronts C and D are supported and projected in and out from the body of the camera by means of the lazy-tongs movement F F' F'', one series of levers of each separate movement being connected to a sliding sleeve, $c$, which slides on the guide $d$.

The guides $d\ d$ are fastened at one or both ends to the front C and partition B by means of the angle-pieces $e\ e$. In the bottom and side of the camera is fastened the screw bed-plate $f$, to which the tripod is attached when it is desired to use one.

At G is shown my plate-holder. This plate-holder is composed of an outer and rigid case, H, and an inner sliding case, I, the outer case, H, being affixed to the camera-body by means of the spring-catch $g$ on the body of the camera engaging with the pin $h$ on the plate-holder. The outer case of the plate-holder is composed of two parts, H and J, the case J being rigidly affixed to the case H and forming an integral part of the same, and between which the inner case I slides. I sometimes call this outer case the "main" or "stationary" case.

Both parts H and J of the outer case are open on the side facing the front of the camera, and the case I is provided with an exposing-shutter, *k*. The accidental shifting of the plate-holder is prevented by the strips *m m* on the body of the camera. The sensitive plates *n n n n* are separated from each other by and are secured in carriers K K, each carrier preserving the plate behind it from being fogged when an exposure is being made.

I fasten at the two end corners of the sliding case I a spring-clip, *o*, the end of which is shown in detail in Fig. 10, in which *a' a'* are the points of the spring-clip that engage with the indentation *a''* of the carrier K when the sliding case I is pulled out to change the plate, the other parts acting to guide the catch over and along the side of the carrier K and sides of the inner case J. On the end of the sliding case I is placed a hinged plate, *r*, so placed that on the outward movement of the case I it will come in contact with the edge of the plate-carrier and assist the spring-clip *o* in drawing out the plate, and on the inward movement of the case I it is pressed up into the recess *w*, formed in the end of the case I, as shown in Fig. 14, thus preventing its interference with the sliding of the case I, and making the removal of the plate an absolute certainty.

Although I have shown and described the spring-clip *o* and the hinged plate *r* as the means I now employ for moving the plates, I do not limit myself to this specific construction, as any analogous device may be employed and still come within my invention.

In the bottom of the case J, I fasten two springs, *p p*, which run the length of the case and tend to continually press the plate forward.

The operation of the plate-holder is best illustrated in Figs. 7, 8, and 9. The operation is as follows: When it is desired to change an exposed plate, the sliding case I is pulled out in the direction of the arrow in Fig. 7, the spring-clip *o* engages with the indentation *a''* of the plate-carrier K, and the hinged plate *r* with the end of the same, drawing plate and case with them, as illustrated in Fig. 7. Fig. 8 shows the plate just about to fall to the bottom of the case I, and shows the end of the plate resting on a spring, *p'*, which breaks the fall of the plate and prevents it from going under the block *q*. I cut in the bottom of the case I a groove, *s*, into which the thumb-screw *t* enters, which prevents the case I from being drawn entirely out, but permits it to be drawn out just far enough to change the plate. The strip *j* assists the pin *h* and catch *g* in retaining the plate-holder by the screw *t* striking against it. In Fig. 9 the plate has fallen to the bottom of the case I, said case having been drawn out to its limit, and the plate is being pushed in under the pile of plates in the direction of the arrow. In this movement of the case I the plate is directed forward by the block *q*, fastened to the case I and placed under the rest of the exposed or unexposed plates, as the case might be. Thus it will be seen in the action of my plate-holder that a plate is exposed, then removed from the top of and placed underneath the pile of plates, thus presenting a new plate for a subsequent exposure. The plates are prevented from rising up too high by the overlapping edge *b'* of the inner case, J, and any lateral movement by the cross-piece *b''*, both being made with the case I.

Having thus described my combined camera and plate-holder in detail, I will now proceed to describe the manner in which it is to be used.

When a picture is to be taken, the camera is either screwed on the tripod by the bed-plate *f* or placed in any desirable position without using a tripod. The plate-holder is then removed and the ground glass inserted in the grooves *l l*. Then push out the front end of the camera until the picture is sharply defined on the ground glass. Remove the ground glass and insert plate-holder, pushing it back until the pin *h* engages with catch *g*, and then insert the thumb-screw *t*. The first forward plate in the plate-holder will then occupy the same position as did the ground glass, as so will each succeeding plate. To make the exposure, draw out the hinged exposing-slide *k*, which can only be drawn out as far as its hinged portion, being limited by the block *k'* on the exposing-slide striking against the end *k''* of the sliding case I. When the exposure is made, replace the exposing-slide. To bring a new plate in position, place the camera so that the front end will be uppermost, draw out sliding case I of the plate-holder by means of the strap as far as it will go, then push it back again all the way, when a new plate will be ready for exposure, and in the exact line previously occupied by the ground glass, and the exposed one placed under the rest. The movable front is held to the camera-body when closed by means of the hooks *u u* and pins *v v*.

The camera-body is provided with a strap, *y*, on the top, by which it may be carried around.

I am aware of the patent granted to W. K. Menns, No. 308,781, dated December 2, 1884. By having my plates in a single pile, instead of dividing them into separate piles, I produce a much more convenient form of case, and by my method the exposed plate is directly placed at the back of the pile, thus dispensing with the inconvenience of the old method, in which the exposed plate was moved away to a separate pile of plates and a previously-exposed plate or an unexposed plate was moved to the rear of the pile, from which the last exposed plate was removed. This operation is complicated, requiring the moving at each change of two plates. By my method only one plate is shifted.

Having thus described my invention, what

I claim, and desire to secure by Letters Patent, is—

1. In a photographic camera, the combination of an extensible front and a rear compartment adapted to hold a series of plates in a single pile, which can be exposed one after another, the exposed plate being, by devices contained within the said compartment, shifted directly from the top to the bottom of the single pile of plates by the relative movement of the two parts forming the compartment, substantially as described.

2. In a photographic camera, a case carrying a series of plates in a single pile, said case being composed of a main or stationary case and an inner sliding case carrying an exposing-shutter, $k$, the plates being contained in the main or stationary case, and which are to be successively exposed, the said shutter $k$ serving to close the front of the inner sliding case when the said inner sliding case is within the main or stationary case, in combination with a camera and lens-cap adapted to close the case to light when the said sliding case is operated to change the front plate to the back of the pile, substantially as described.

3. In combination with a photographic camera, the lazy-tongs movement for projecting in and out and supporting the camera-front, composed of the parts F F' F'', one series of levers of each separate movement being connected to the sliding sleeves $c\ c$, which slide on the guides $d\ d$, substantially as described.

4. In combination with a photographic camera, a plate-shifting device, in which a number of plates are placed, said plates being automatically shifted from the top of the pile to the bottom by devices contained in and operated with a sliding case, substantially as described.

5. In a photographic camera, the combination of a case carrying a series of plates, said case being arranged so that one part is adapted to slide within another, the sliding inner portion serving to withdraw a plate from the top of the pile when moved outward and shove it under the pile when moved inward, substantially as described.

6. In a photographic camera, the combination of a case containing a series of plates, each plate being within a carrier, said carrier being adapted to engage with spring-catches within the case, so that the movements of the parts of the case will move the plates, substantially as described.

7. In a photographic camera, the combination of a two-part case containing a series of plates and devices within the said case which, when the case is operated, carry the exposed plate from the front to the back of the pile, and a spring adapted to force forward the pile of plates, so that after each operation of the case the plate to be exposed occupies the same position as the previously-exposed plate or plates, substantially as described.

8. In a photographic camera, the combination of a case carrying a series of plates, having an outer portion adapted to be connected to the camera, and an inner sliding portion arranged to be withdrawn when an exposed plate is to be shifted, said sliding portion when drawn out providing a space in which the plate can be shifted from the top of the series to the bottom of the series, substantially as described.

9. In a photographic camera, the combination of a case to hold a series of plates, said case adapted to be arranged to connect with a camera, and means of changing the top plate of the series to the bottom of the series by operating the plate-holding mechanism, and a spring arranged to move the entire series of plates upward, substantially as described.

10. In a plate-holder for cameras, the combination, with an outer and stationary case carrying a series of plates and formed of two parts, both being integral with the other, of a sliding case, said case sliding between the two parts of the outer case and carrying with it the plate changing and exposing mechanism, substantially as described.

11. A plate-holder for photographic cameras, composed of an inner and outer case of any preferred shape, said outer case being composed of two parts, one part of which is fastened inside and at one end to the outer case, the combination of these two forming a case wherein the inner case slides, substantially as described.

12. In a photographic camera, the combination of a case containing a series of plates in a single pile, said case being adapted to be attached to a photographic camera, and a sliding case to which a spring-clip and hinged plate are secured for automatically shifting the exposed upper plate of the single pile directly to the back of the pile, substantially as described.

13. In a plate-holder for photographic cameras, the combination of the sliding case I and the hinged plate $r$, carried by the case I, and adapted to engage with the end of the plate-carrier K, substantially as described.

14. In a plate holder for photographic cameras, the combination of the plate-carrier K, notched as at $a''$, and the spring-catches $o\ o$, adapted to engage with the notched carriers and carried by the sliding portion I of the plate-holder, substantially as described.

15. In a plate-holder for photographic cameras, the block $q$, adapted to press upon the end of the removed plate and carrier and force the same into position under the pile of plates, in combination with the inner and outer case of the plate-holder, substantially as described.

16. In a photographic camera, a plate-carrier provided with angular indentations $a''\ a''$, formed in its sides for engagement with the shifting mechanism which is carried by the sliding portion of the plate-holder, substantially as described.

17. In a plate-holder for photographic cameras, the combination, with the inner and outer sliding cases, H and I, adapted to operate as described, for changing the plates, and a limiting-screw, $t$, sliding in the groove $s$, substantially as described.

In testimony that I claim the foregoing as my invention I have signed my name, in presence of two witnesses, this 19th day of October, 1886.

JOHN LOEBER.

Witnesses:
GEORGE W. BORCHERS,
M. E. STODDARD.